Oct. 20, 1970    H. LAKIN ET AL    3,535,039
APERTURE CARD REPRODUCER AND DUPLICATOR
Filed Oct. 24, 1967    9 Sheets-Sheet 1

INVENTORS
HAROLD LAKIN &
THOMAS REED BRISTOL
BY Sherman Levy
ATTORNEY

FIG.-17B

United States Patent Office 3,535,039
Patented Oct. 20, 1970

3,535,039
APERTURE CARD REPRODUCER AND DUPLICATOR
Harold Lakin, Portolo Valley, and Thomas R. Bristol, San Carlos, Calif., assignors, by mesne assignments, to Kleer-Vu Industries, Inc., New York, N.Y., a corporation of New York
Filed Oct. 24, 1967, Ser. No. 677,576
Int. Cl. G03b 21/14
U.S. Cl. 355—100                                9 Claims

ABSTRACT OF THE DISCLOSURE

An aperture card reproducer and duplicator in which a master aperture card is fed from a stack to an exposure station and copy cards are fed one at a time from a stack to the exposure station to be placed in juxtaposition with the master aperture card. After the copy card is exposed within the exposure station it is moved to the developing station and then to an exit hopper. The machine is provided with circuitry to produce a preselected number of duplicated copy cards and to expose each copy card for a preselected time interval. After the preselected number of copy cards have been exposed, the master aperture card is automatically ejected to an exit hopper and the next master aperture card moved to the exposure station.

---

This invention relates to an apparatus for the mechanized production of diazo film duplicates of either silver or diazo film originals and more particularly to a fully automatic diazo film duplicator or reproducer machine. Such film duplicates commonly occur as the analogue storage section of a so called aperture card or copy card, that is to say, an electronic accounting machine tabulating card in which a section of the card has been removed and replaced with a piece of light sensitive film.

An object of the present invention is to provide a copy card reproducer and duplicator that requires little attention so as to permit the user to run more than one machine at a time depending on varying workloads so that, for example, other tasks can be performed while the machine is operating or running.

Another object of the present invention is to provide a copier that will reproduce all types and makes of cards, and wherein fully automatic, unattended operation is assured, and wherein there is provided a hopper feed input with separate controls for masters and copies, the present invention being easily serviced and being available for various types of film, there being a "no jam" construction which assures against lost sequence and ruined cards.

Another object is to provide a copy card reproducer and duplicator that may be utilized speedily and with precision by even inexperienced operators, and wherein the present invention is rugged in structure and foolproof in operation.

These and other objects of the invention will become apparent from a reading of the following specifications and claims, together with the accompanying drawings, wherein like parts are referred to and indicated by like reference characters, and wherein:

Figure 2:
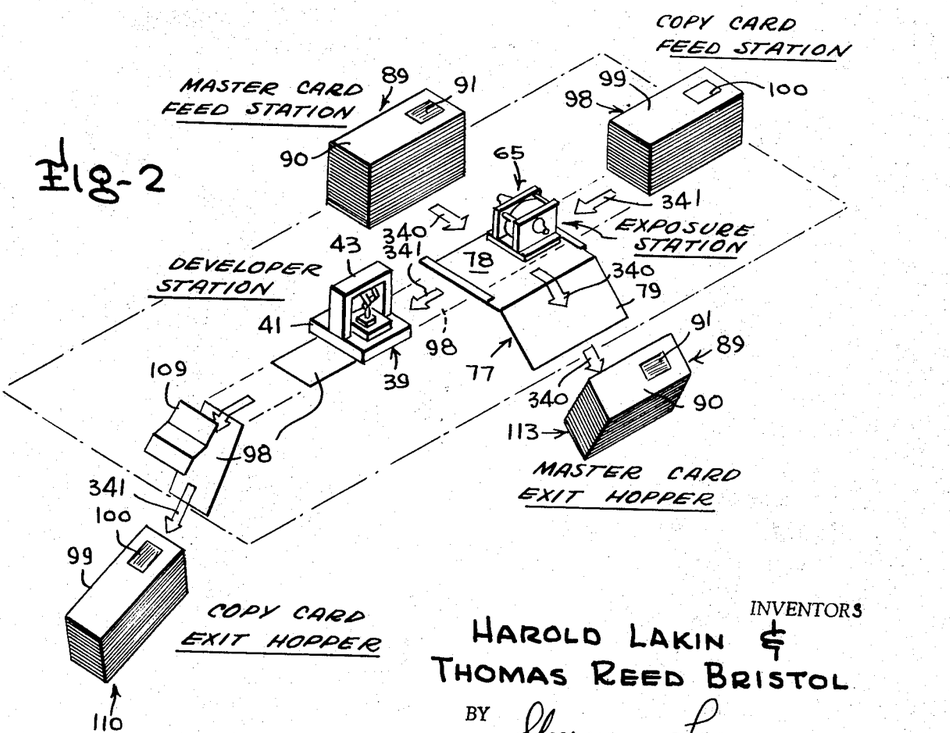
FIG. 2 is a schematic view illustrating diagrammatically the flow pattern for the operation of the present invention.

The present invention is constructed to produce high resolution copies of aperture card masters and it copies the master card by obtaining an image via contact printing and then developing it. Referring to FIG. 2 the master cards 89 are manually placed in the master card feed station with the emulsion side down and the aperture to the right. The copy cards 98 are manually placed in the copy card feed station with the emulsion side up and the aperture to the right. The present invention is constructed to produce a set number of copies of each master card and to expose each copy card for a given period of time. Automatic operation starts with a master card 89 and a copy card 98 being moved to the exposure station 65 by their respective transport systems, and there they are superimposed and pressed tightly together and illuminated with a light source such as a high pressure mercury vapor lamp. The light shines through the master card film 91 onto the copy card film 100 leaving a latent image on the sensitized surface of the copy card film 100. The duration of the exposure cycle, which is the time the shutter is open, is controlled by the timer dial on the front control panel. After exposure the copy card 98 is transported to the developer station 39 and the copy card counter U1, U2 is advanced one digit. When the selected number of copies entered into copy selector switches SW1, SW2 have been exposed the master card 89 is ejected to the master card exit hopper 113 and the next master card 89 is moved from the master card feed station into the exposure station 65. The exposure cycle is then repeated with the new copy cards 98 being fed into the exposure station 65.

From the exposure station 65 the copy card 98 is indexed to the developer station 39. Here the copy card film 100 is developed by suitable means. At the completion of the development cycle the copy card 98 is ejected to the copy card exit hopper 110.

Figure 1:
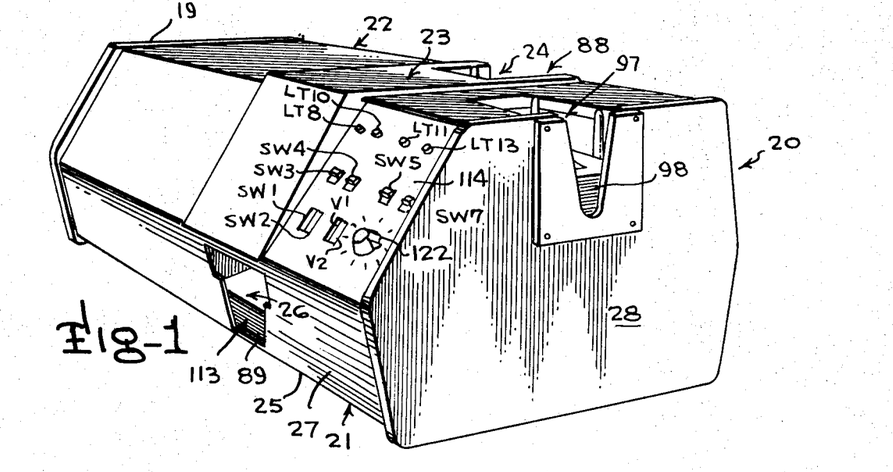
FIG. 1 is a perspective view of the copy card reproducer of the present invention.

Referring in detail to the drawings, the numeral 20 indicates the reproducer and card duplicator of the present invention which includes a housing or base 21, and a pair of cover portions or members 22 and 23 are adapted to be hingedly connected to rear portion of the housing 21, FIG. 1. The housing or base 21 includes a bottom wall portion 25 as well as an upstanding portion 27 that has an opening 26 therein for a purpose to be later described. The cover member 23 has an opening or recessed portion 24 therein. As shown in the drawings there is provided a pair of spaced parallel vertically disposed panels 19 and 28 which are suitably affixed to the ends of the base or housing 21, and the numeral 29 indicates a chassis which is arranged within the device, and the chassis 29 defines or provides a deck, and the ends of the deck or chassis may be suitably secured or affixed to the panels 19 and 28 in any suitable manner as, for example, by means of securing elements such as screws, bolts or the like. The deck 29 may be suitably supported in place by means of posts, legs or the like.

Figure 3A:
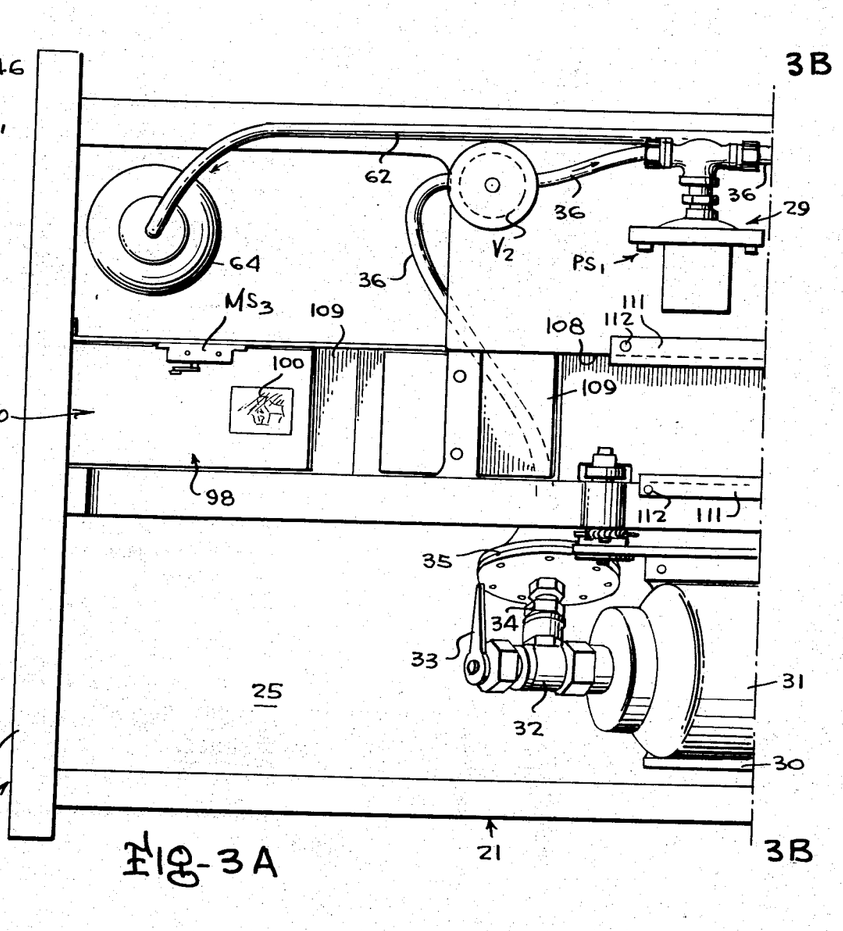
FIGS. 3A and 3B are top plan views with the cover removed for clarity of illustration.
Figure 3B:
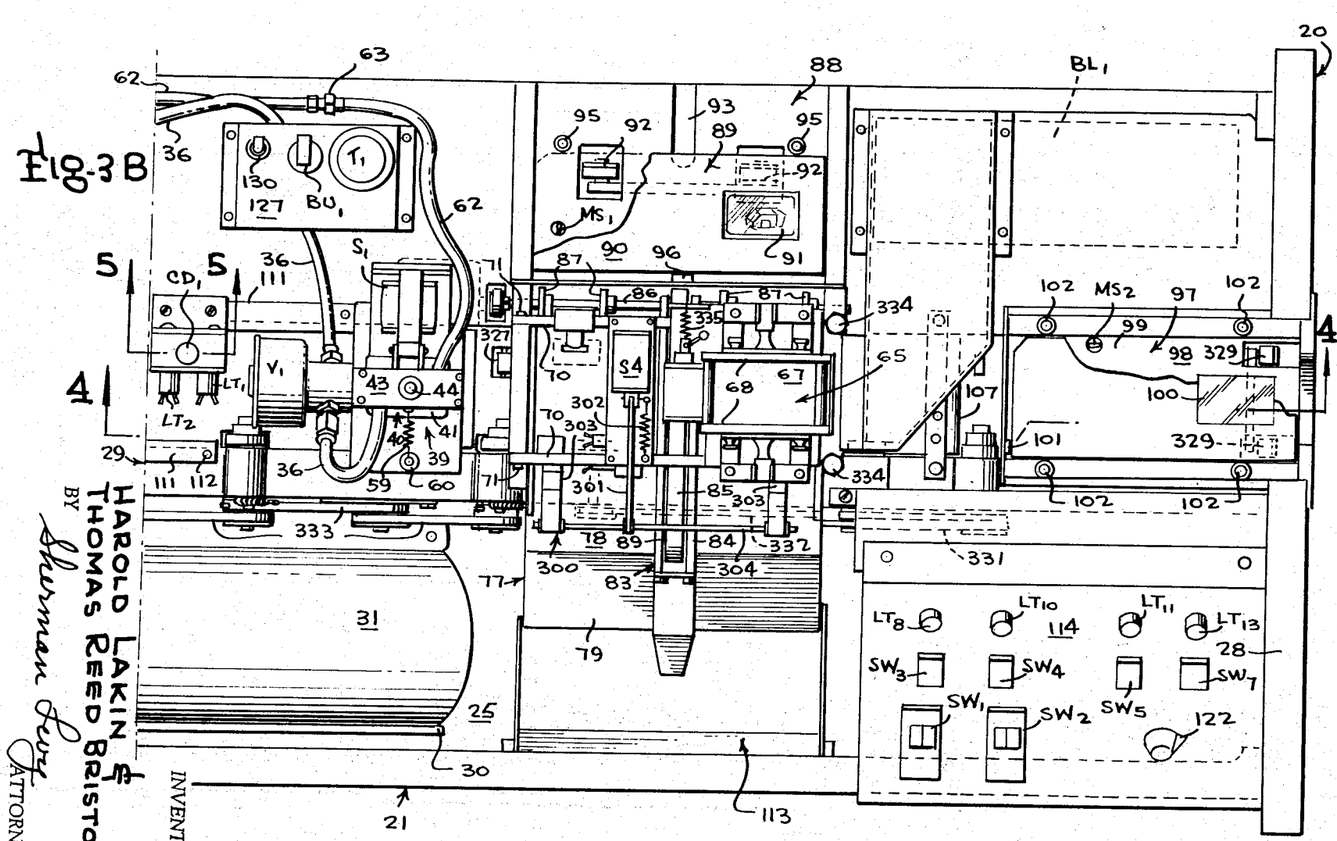

Referring to FIGS. 3A and 3B, the numeral 30 indicates a cradle which is arranged in the housing 21, and a bottle 31 is supported by the cradle 30, and the bottle 31 may contain anhydrous ammonia therein. The numeral 32 indicates a valve for the anhydrous ammonia bottle 31, and a manually operable lever or crank 33 can be used for turning the ammonia supply on or off. The numeral 34 indicates a quick-disconnect coupling for the ammonia bottle 31, and there is further provided a pressure regulator 35, and the numeral 36 indicates the conduit or line for supplying ammonia from the bottle 31 to the developer station as shown in the drawings. A solenoid valve V2 is suitably mounted on the deck 29, and the solenoid valve V2 is connected to the supply line 36, and there is further provided a pressure switch PS1 for detecting pressure drop in the line 36.

Figure 13:
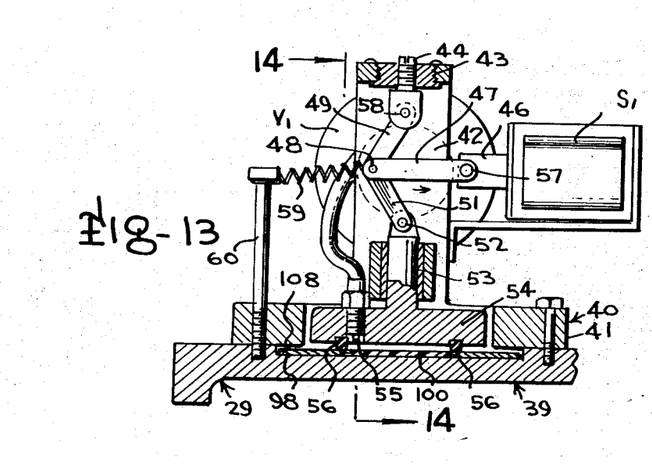
FIG. 13 is an enlarged sectional view taken on the line 13—13 of FIG. 4.
Figure 14:
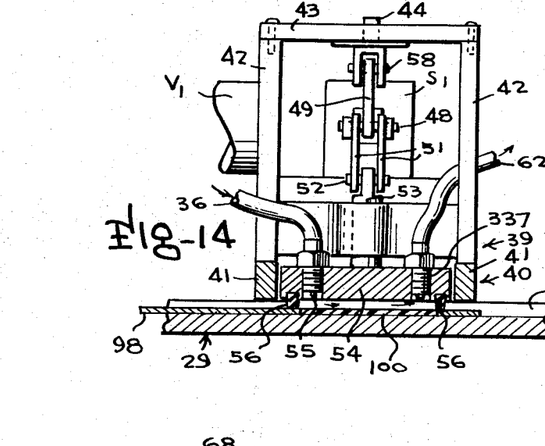
FIG. 14 is a sectional view taken on the line 14—14 of FIG. 13.

The numeral 39 indicates a developer station which includes a bracket or body member 40 that is suitably mounted on the deck 29, and the bracket 40 includes a bottom section 41 which has upstanding portions 42 thereon, and a cross piece 43 is suitably affixed to the upper ends of the sections 42, FIGS. 13 and 14. A stud 44 depends from the cross piece 43, and the reference character S1 indicates a solenoid that is adapted to actuate or move a member 46 that has links 47 connected thereto as at 57, and the links 47 are connected to a link element 49 as at 48, the link member 49 being pivotally connected as at 58 to the stud 44. Link pieces 51 have their upper ends connected to the pin 48, and the lower ends of the members 51 are pivotally connected as at 52 to the upstanding portion 53 of a developer plate 54. The numeral 59 indicates a return spring which has one end connected to the pin 48, and the other end of the return spring 59 is connected to a stud or bolt 60 which has its lower end suitably anchored to the bracket 40, as shown in the drawings. The numeral 55 indicates the developer plate gas inlet and the numerals 56 indicate developer plate seals, FIGS. 13 and 14.

The reference character V1 indicates a solenoid valve that is connected to the inlet line 36 for metering the supply of gas or anhydrous ammonia. As shown in the drawings, there is provided an exhaust line 62 which is connected to the developer station 39, and the exhaust line 62 has a bleeder valve 63 connected thereto, and the exhaust line 62 leads to or is connected to an exhaust gas absorber container 64 which may have a suitable chemical therein such as citric acid.

Figures 7, 8, 9:
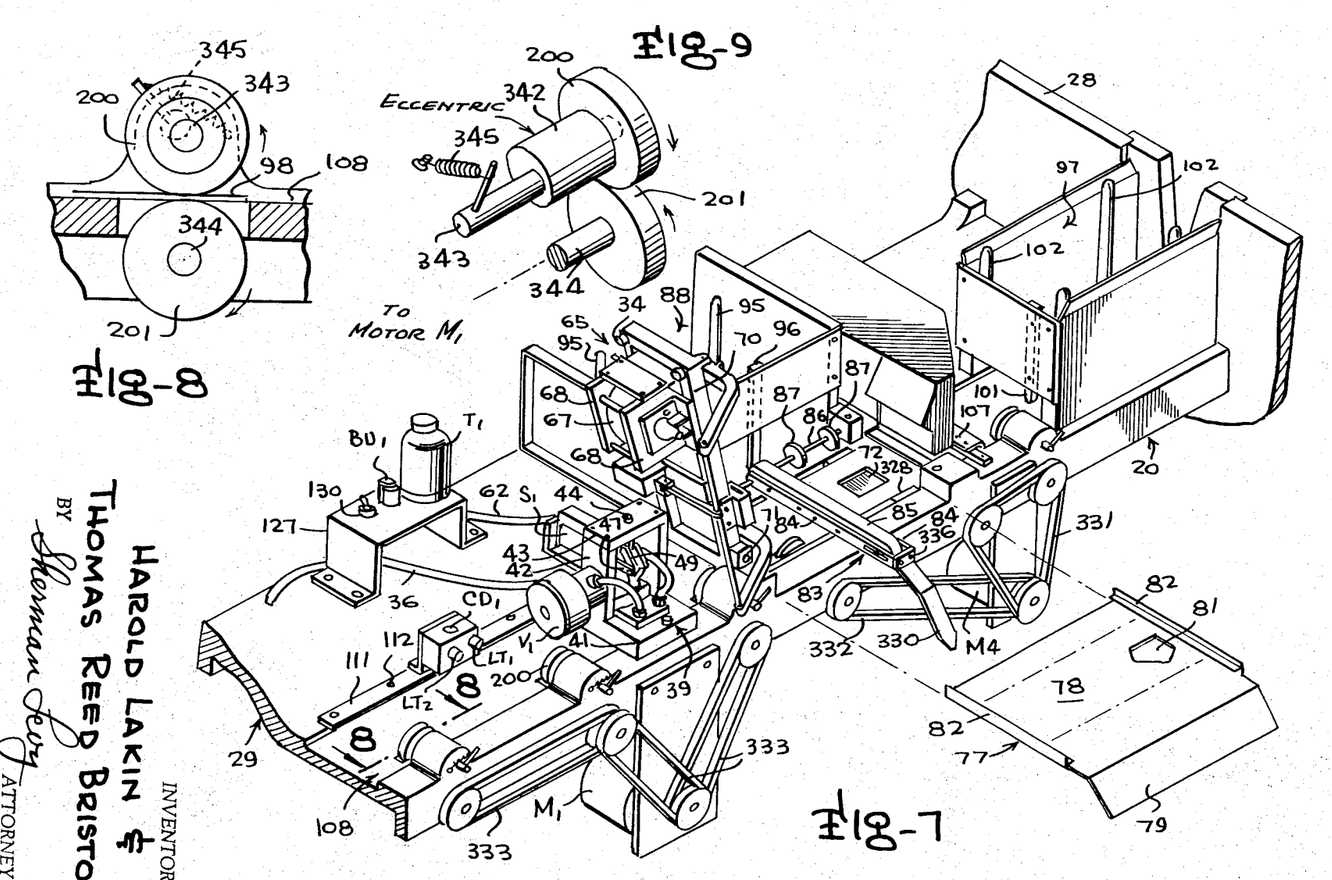
FIG. 7 is a top perspective view of the construction shown in FIG. 3B, with the exposure station folded back.
FIG. 8 is an enlarged sectional view illustrating the drive wheels and taken on the line 8—8 of FIG. 7.
FIG. 9 is a diagrammatically perspective view of the drive wheels.
Figure 15:
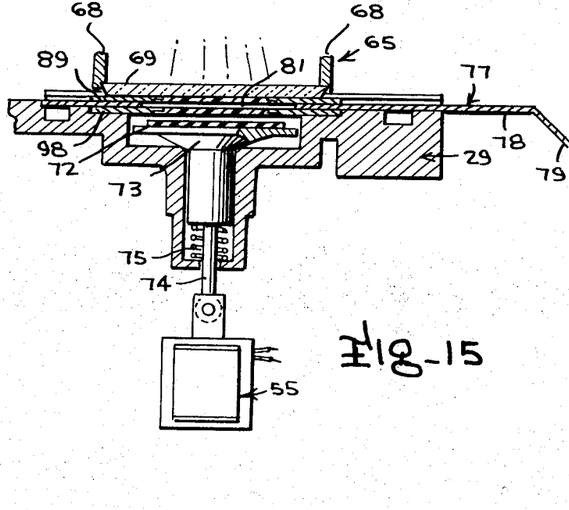
FIG. 15 is an enlarged sectional view taken on the line 15—15 of FIG. 4.
Figure 16:
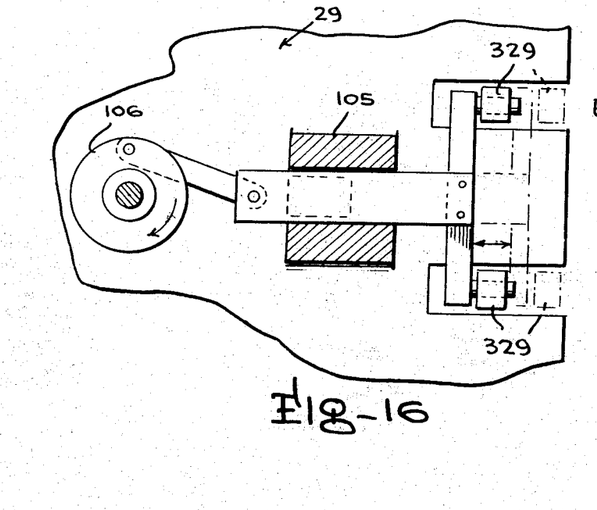
FIG. 16 is an enlarged sectional view taken on the line 16—16 of FIG. 4.

There is further provided an exposure station which is indicated generally by the numeral 65, and the exposure station 65 includes a light LT12 having a reflector 67 contiguous thereto, and the exposure station 65 further includes wall pieces 68, as well as a transparent plate 69, and the exposure station is mounted on swingable arms 70, and the arms 70 may be hingedly or pivotally connected to shouldered portions or projections on the deck 29 by means of a pivot pin or shaft mounting 71, so that when desired the exposure station can be swung or pivoted to a raised or out-of-the-way position as shown in FIG. 7, for example. There is also provided for the exposure station 65 a pressure pad 72, movable plunger 73, FIG. 15, and a spring member 75 which is superimposed on an extension 74 that depends from the plunger 73, and a solenoid S5 is provided for actuating or moving the plunger 73 as shown in FIG. 15.

In the drawings, the numeral 77 indicates a card tray which, as shown in FIG. 7, includes a flat section 78 that has an opening 81 therein, and the card tray 77 further includes an inclined portion 79, the card tray 77 also including spaced parallel upstanding master card guiding flanges 82.

The numeral 83 indicates a master card exit guide which includes spaced parallel bars or elements 84 that have a drive belt 85 mounted therebetween, and the numeral 86 indicates a drive shaft which has wheels 87 thereon.

As shown in the drawings, there is provided a master card feeding station 88 which is adapted to hold a supply of master cards 89. Each of the master cards 89 is of generally rectangular formation and may include a main body portion 90 of card stock with a microfilm 91 suitably sealed thereto.

The master card feeding station 88 includes claws 92 for moving the master cards from the hopper or station 88 individually, and the master card feeding station 88 further includes a finger trough 93 as well as a sensing microswitch MS1, together with rear guide posts 95. The numeral 96 indicates a gate for allowing only one card 89 at a time to leave the feeding station 88.

Figure 4:
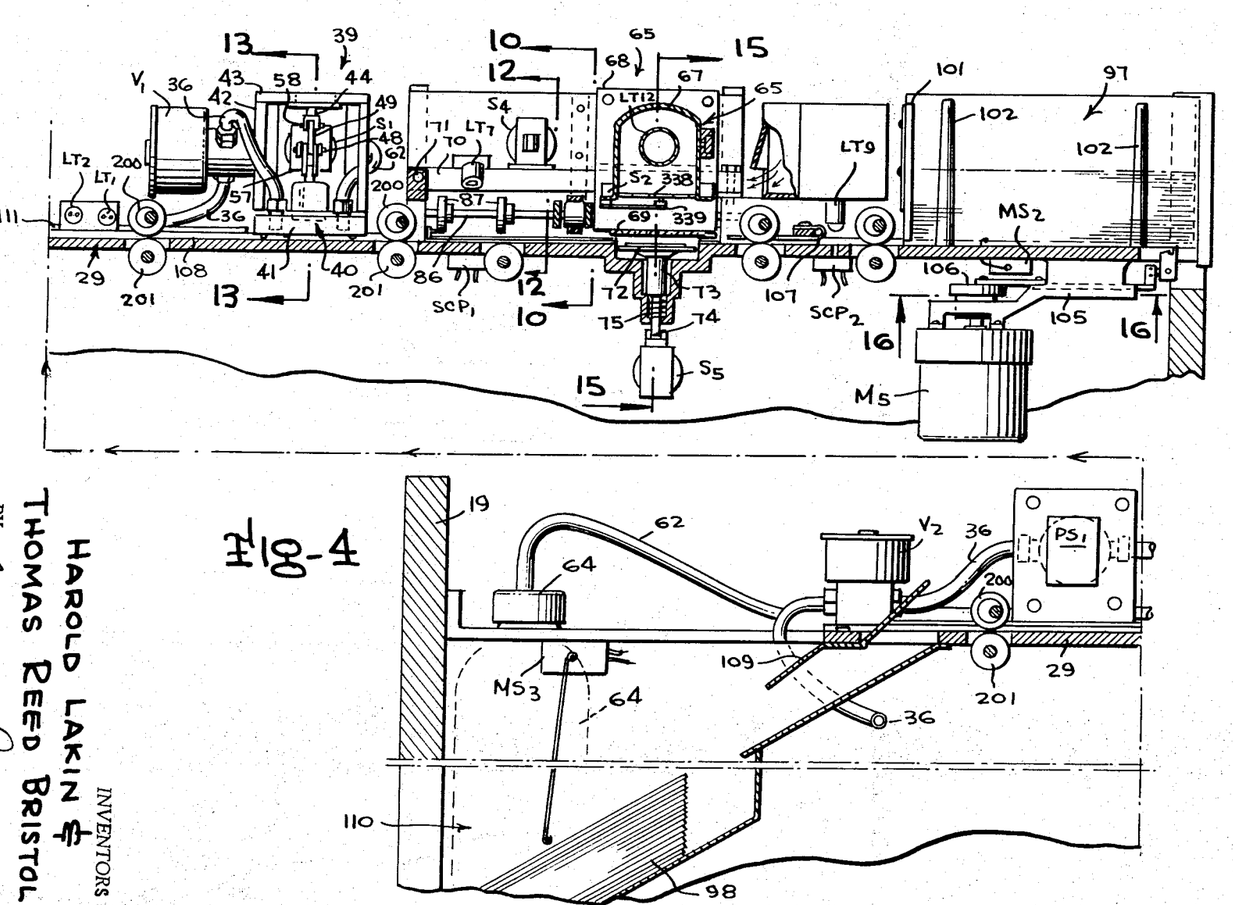
FIG. 4 is a sectional view taken on the line 4—4 of FIG. 3B.

There is further provided for the present invention a copy card feeder station or hopper which is indicated generally by the numeral 97, and a plurality of superimposed copy cards 98 are adated to be arranged in the feeder station 97, and the copy cards 98 may be of the type that include card stock 99 having microfilm 100 affixed thereto or sealed thereto, and the film 100 for the copy cards is shown in FIG. 2. The numeral 101 indicates a gate for the copy card feeding station 97, and there is also provided for the feeding station 97 guide posts 102, as well as a copy card sensing microswitch MS2. In FIG. 4, the numeral M5 indicates the copy card feeder motor, and the numeral 105 indicates the copy card feeder assembly, while the numeral 106 indicates the copy card feeder assembly eccentric. The numeral 107 indicates a card guide, and the upper surface or portion of the deck 29 may be recessed as at 108 to provide a trackway for the copy cards to travel through the trackway having eccentrically mounted, spring-biased top clamping rollers 200 and cooperating bottom driving rollers 201, as shown in FIGS. 8 and 9, the bottom rollers 201 being driven by motor M1, the copy cards being clampingly engageable by the cooperating pairs of rollers 200, 201. The copy cards are adapted to engage a copy card exit guide 109 whereby the copy cards will be guided to an exit station as indicated diagrammatically in FIG. 2 by the numeral 110. Plate members 111 may be secured to the deck in any suitable manner, as for example by means of securing elements such as screws 112 to provide a guiding means for the copy cards.

The numeral 113 indicates the master card exit station, FIG. 1.

A panel or plate member 114 is adapted to be hingedly connected to the upper front poltion of the machine and suitable control switches and the like are adapted to be conveniently arranged thereon. For example, the front panel or plate member 114 has a copy card feeder switch SW4 thereon as well as a copy card "empty" lamp LT10, and there is also provided on the panel 114 a master card feeder switch SW3 which has a master card feeder "empty" lamp LT8 associated therewith. The numerals SW1 and SW2 indicates a multicopy selector, while the numerals U1 and U2 indicate a multicopy counter, and the numeral 122 indicates an exposure timer control. The numeral SW7 indicates a line switch having a lamp LT13 associated therewith, and there is also provided an operating switch SW5 having a lamp LT11 asociated therewith.

In FIG. 7, the numeral 127 indicates a bracket or support member which has a develop station timer T1 thereon, as well as a buzzer BU1, and an exposure station lamp switch SW6.

Figures 10, 11, 12:
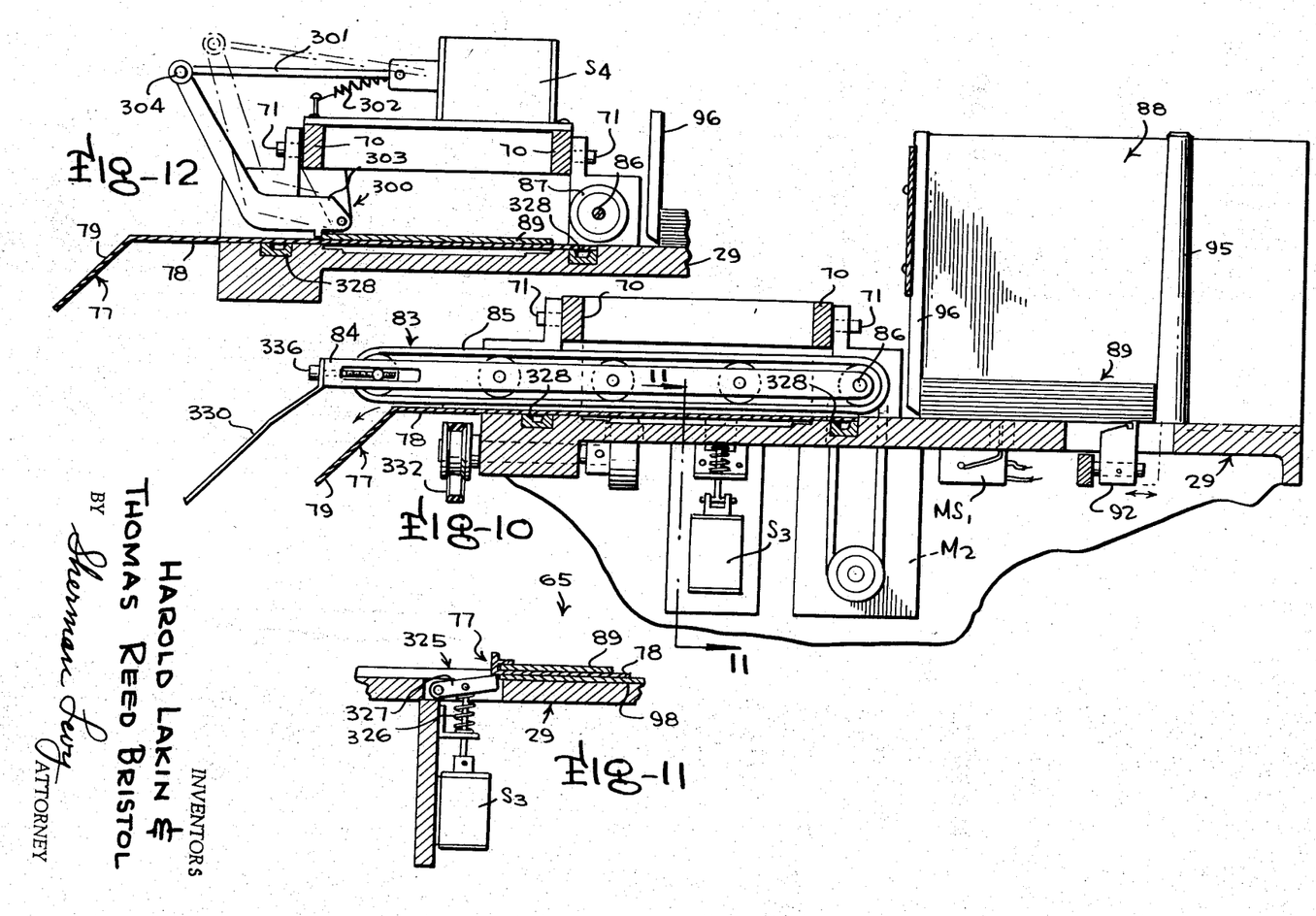
FIG. 10 is an enlarged sectional view taken on the line 10—10 of FIG. 4.
FIG. 11 is a sectional view taken on the line 11—11 of FIG. 10.
FIG. 12 is an enlarged sectional view taken on the line 12—12 of FIG. 4.

In the drawings, the numeral 328 indicates magnets for the tray 77. The numerals 329 indicate claws or pushers for the copy cards 98. In FIG. 10 the numeral 330 indicates a guide for the cards and the guide 330 serves to guide or direct the cards downwardly in the proper direction. As shown in the drawings, the motor M4 is driving two belt drives 331 and 332. The belt drive 332 supplies power to the rollers 201 to progress or move the copy cards from the exposure station to the developer station. The motor M1 supplies power to the rollers 201 to progress or move copy cards from the developer station 39 to the copy card hopper or receiver by means of drive belts 333.

Air from the blower BL1 is adapted to be used for cooling the exposure station. In FIG 3B the numeral 334 indicates thumb screws for holding the exposure station down and release of these thumb screws 334 permits opening of the exposure station, as shown in FIG. 7. The numeral 335 indicates the exposure station shutter return spring. The numeral 336 indicates drive belt tension control screws. In FIG 14 the numeral 337 indicates a fitting which provides a gas exhaust adapter or fitting for the exhaust line 62. In FIG. 4 the numeral 338 indicates the exposure station shutter mechanism and the numeral 339 indicates the exposure station shutter mechanism bottom.

Figure 5:
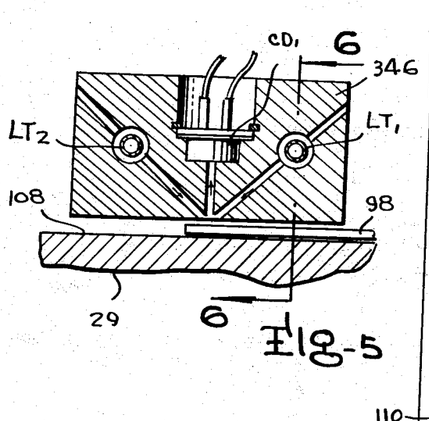
FIG. 5 is an enlarged sectional view taken on the line 5—5 of FIG. 3B.
Figure 6:
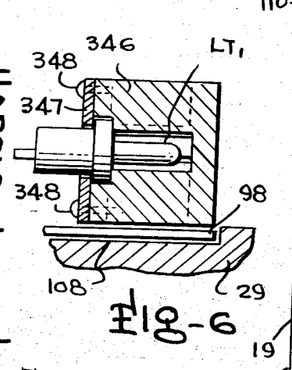
FIG. 6 is a sectional view taken on the line 6—6 of FIG. 5.

In FIGS. 5 and 6 the numeral 346 indicates the sensor block which may have a socket clamp plate 347 secured thereto in any suitable manner as, for example, by means of securing elements or screws 348.

Figure 17A:
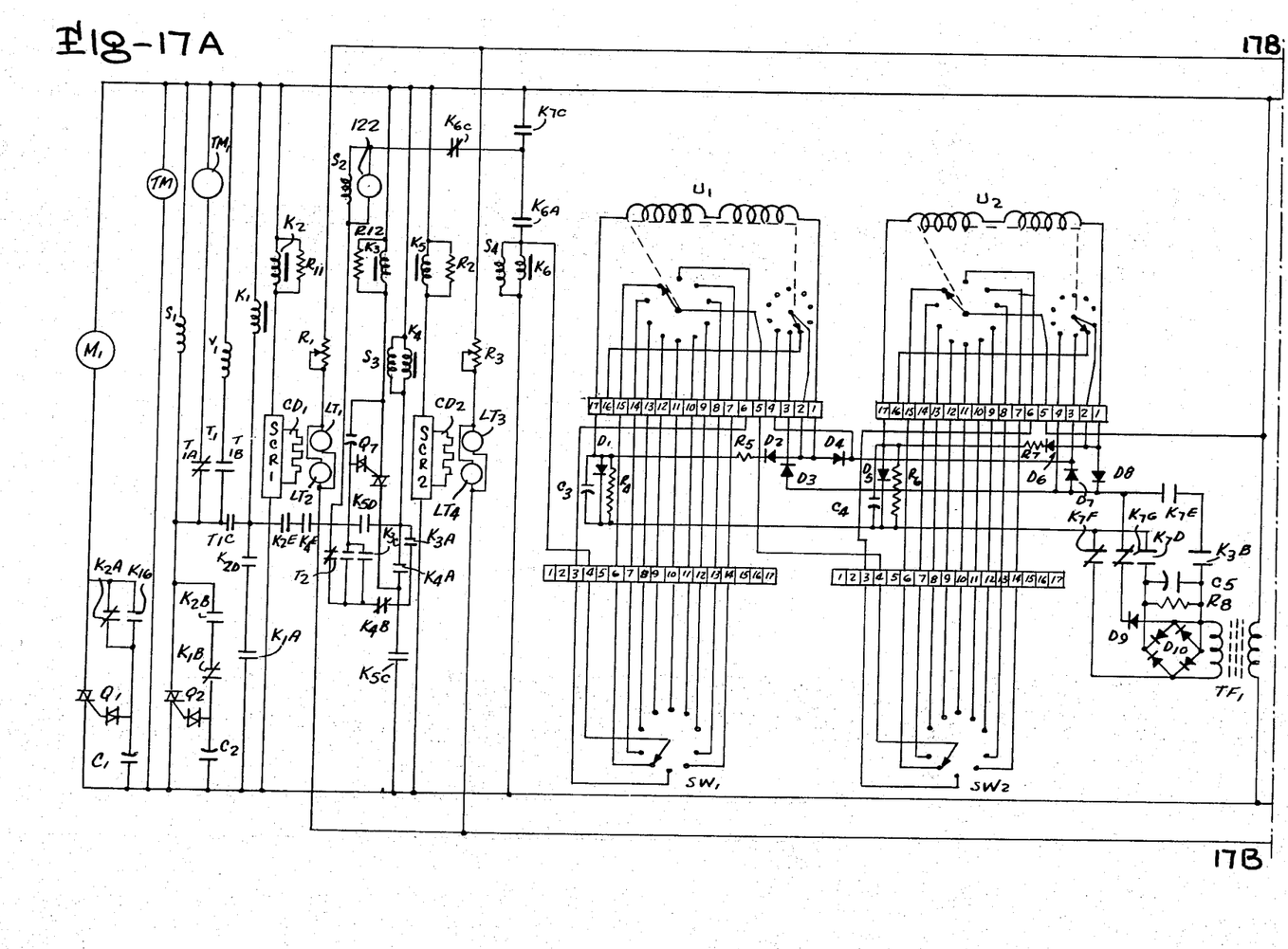
FIGS. 17A and 17B are electrical diagrams illustrating the circuitry for the present invention.
Figure 17B:
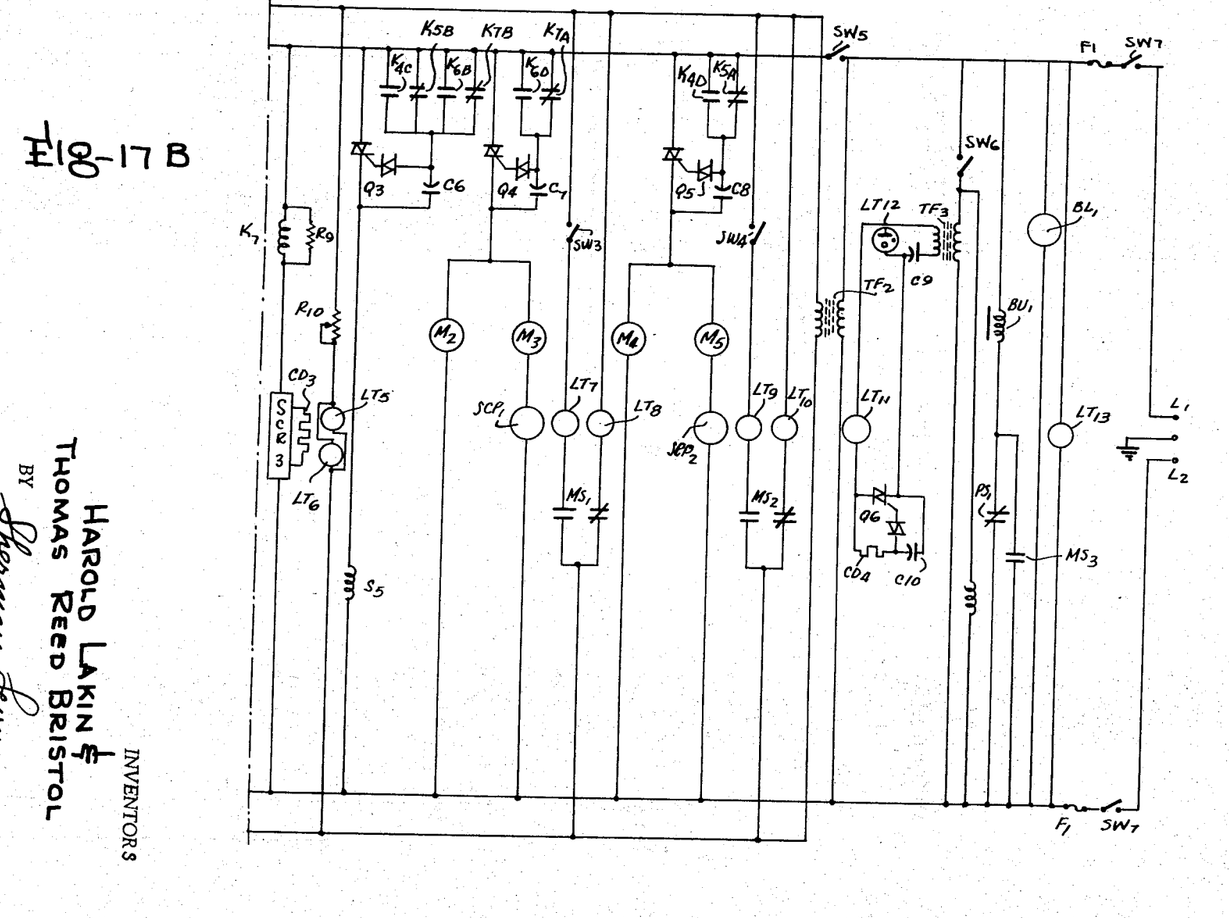

The following is provided as a sequence of electrical operation for the present invention, and attention is directed specifically to FIGS. 17A and 17B of the drawings. Assuming that the repeater does not have any cards in it and operation of the unit is initiated or started by by turning on the "Line" switch SW7, and when this switch SW7 is closed power is applied to the following circuits:

(1) "Line" Indicator Light LT13
(2) Buzzer BU1
(3) Blower BL1
(4) Constant Voltage Transformer TF2

This results in the "Line" indicator light LT13 turning on to indicate that line voltage has been applied. Voltage is also applied to the sensor lamps and also to the master card and copy card feeder indicator lights LT8 and LT10, and the blower BL1 begins to supply cooling air to the exposure lamp.

In addition, when switch SW6 (which is located on the Developer Timer sub-chassis) is closed, voltage is applied to the exposure lamp LT12 and the ammonia input solenoid valve V2. Also the "operate" indicator light LT11 will turn on in approximately six to eight minutes when the exposure lamp LT12 intensity reaches a level sufficiently high to actuate the indicator lamp circuit, and this circuit operates as follows:

The light from the exposure lamp LT12 illuminates the face of photocell CD4 which causes its resistance to decrease, and it is to be noted that its resistance varies inversely with the illumination. Next, the photocell resistance recreases from 100,000 ohms to approximately 3,000 ohms and the gate of Quadrac Q6 is turned on and this causes Q6 to conduct which in turn applies voltage to indicator lamp LT11.

If the ammonia gas supply pressure is less than 15 pounds per square inch the normally closed contact of the pressure switch PS1 will be closed and the buzzer will be energized. Also, if the switch MS3 located in the copy card exit hopper 110 is closed due to excessive cards, the buzzer will be operated. Further, closing the "Operate" switch SW5 applies voltage to the remaining circuits of the repeater. Then the copy card drive motors M1 and M4 will begin to run as will the master card belt drive motor M2. Simultaneously the pressure pad solenoid S5 is energized which pulls the spring loaded pressure pad 72 out of the path of the copy and master cards. The placement of the cards in the copy card feeder hopper 97 pushes down on the wire lever arm of switch MS2, and this opens the normally closed contact which removes voltage from the copy card feeder indicator lamp LT10. It also closes the normally open contact in the copy card feeder sensor lamp LT9 circuit. It is to be noted that if the copy card feeder rocker switch SW4 which is located on the control panel 114 is pushed to the "on" position lamp LT9 is turned on, its light is coupled through a hole in the deck plate to the photo sensor assembly SCP2. When light strikes the photo sensor it energizes the copy card feeder motor M5 which pushes the copy card 98 out of the hopper. When the copy card has extended to the point where it is engaged by the drive rollers it moves between the lamp LT9 and the photo sensor SCP2 blocking the light path which turns off the feeder motor M5.

Also the copy card 98 continues to move toward the exposure station 65 by way of the drive rollers driven by motor M4, and when the card is in position in the exposure station, light from lamps LT3 and LT4 reflect from its surface to photocell CD2. The photocell's resistance is decreased to the point where it triggers its SCR circuit and energizes relay K5, and when relay K5 is energized it opens the normally closed contact K5A which is part of the Quadrac Q5 circuit controlling motors M4 and M5. When this contact is opened, voltage is removed from motor M4 which automatically brakes the shaft of the motor and causes the motion of the copy card to stop, and the timing is adjusted so that the card stops when it reaches the mechanical card stop mechanism controlled by solenoid S3, as shown in the drawings.

It is to be noted that if master cards 89 are placed in the master card feed hopper 88, the switch MS1 is actuated, and this turns off the master card feeder indicator LT8 and closes the normally open contact in the master card feeder sensor lamp (LT7) circuit. Also, if the master card feeder rocker switch SW3 which is located on the control panel is pushed to the "on" position, lamp LT7 is turned on and its light couples to the master card feeder photo sensor SCP1, and this in turn energizes the master card feeder motor M3 drivingly coupled to claws 92, which pushes a master card 89 out of the master card feeder hopper 88. Further, when the card 89 has been moved to the point where the master card belt can engage it, the light path from LT7 to the photo sensor SCP1 is blocked, and this causes the motor M3 to stop.

Next, the master card 89 is moved by motor M2 to its proper position in exposure station 65, and at this point the light from lamps LT5 and LT6 is reflected from the card surface to photocell CD3. The resistance of photocell CD3 decreases which turns on its associated SCR circuit to thereby energize relay K7, and when relay K7 is energized its normally closed contract K7A in the Quadrac Q4 circuit is opened and this turns off the Quadrac Q4 which removes voltage from motors M2 and M3 which stops the master card motion. It is to be noted that the timing is adjusted so that the master card 89 stops when it reaches the mechanical master card stop mechanism 300 controlled by a solenoid S4, as shown in the drawings. The master card mechanism 300 includes a positive stop link 301, return spring 302, positive stop elements 303, and a cross bar 304 that connects the left and right stops 303 to the link 301, as shown in the drawings.

Also, when both the master card 89 and the copy card 98 are in position in the exposure station 65, power is removed from the pressure pad solenoid S5, and the spring loaded pressure pad 72 will force the copy card 98 and master card 89 tightly together against the glass platen 69 of the exposure station 65. This is accomplished due to the opening of the normally closed contacts of relays K7B and K5B which are in the Quadrac Q3 circuit. The normally open contacts of these relays K7C and K5C in series with the timer motor TM2 and shutter solenoid S2 circuit are closed which opens the shutter and initiates the exposure timing cycle. Then, after the chosen exposure time cycle has elapsed the normally open timer contact T2 closes which energizes relay K3, closing its holding contacts K3C, which in turn energizes relay K4 and the copy card stop solenoid S3 through contact K3A. It also closes contact K3B in the counter circuit which causes the counter to advance one digit. At the same time the normally closed time contact T2 opens which removes power from the timer motor thereby allowing the timer to reset. Further, when relay K4 is energized it closes contact K4A, and this "locks" K4 in the energized position through contact K5C, and the copy card stop solenoid S3 moves the mechanical card stop out of the way so as to permit the copy card 98 to leave exposure station 65. The numeral 325 indicates the exposure station copy card stop mechanism and, as shown in FIG. 11 of the drawings, this mechanism 325 includes a return spring 326 and a copy card stop 327. Also, energizing relay K4 opens contact K4B in the timer T2 circuit which prevents the timer from re-initiating its timing cycle, and this also results in relay K3 having power removed therefrom.

The operation of relay K4 also serves to close the normally open contact K4C and to energize the pressure pad solenoid S5, and at the same time normally open contact K4D is closed which energizes motors M4 and M5 and thereby moves the copy card 98 out of the exposure station 65 so as to feed the next card into the station 65.

It is to be noted that the copy card 98 leaving the exposure station 65 is engaged by rollers driven by motor M1 and is moved into the developer station 39. When the trailing edge of the copy card 98 passes the exposure station copy card sensor the light from lamps LT3 and LT4 no longer reflects into photocell CD2, and this causes relay K5 to drop out thereby deenergizing relays K4 and copy card stop solenoid S3 through the opening of contact K5C and restores the exposure station sensor circuits to the initial condition ready to detect the next copy card 98. Further, when the copy card 98 is in the proper position in the developer 39, light from the sensor lamps LT1 and LT2 is reflected into the photocell CD1 which energizes relay K2 through its SCR module. When relay K2 is energized normally closed contact K2A in the Quadrac Q1 circuit is opened thereby removing power from motor M1 and in turn stopping the copy card 98. Simultaneously, normally open contact K2B in the Quadrac Q2 circuit is closed, and this applies power to the development clamping solenoid S1 and development timer clutch TM1. The energizing of solenoid S1 clamps the development chamber over the copy card 98. After approximately ½ second, timer contact T1B closes and power is applied to the development solenoid valve V1 so as to permit gas to flow into the development chamber.

It is to be noted that at the end of another ½ second interval contact T1B will re-open to thereby remove power from the solenoid valve V1 and shut off the gas flow to the development chamber. The development timer continues to run for a total elapsed time of approximately 15 seconds at the end which it closes normally open contact T1C and opens normally closed contacts T1A to remove power from the developer timer clutch TM1. This causes voltage to be applied to relay K1 which in turn locks itself closed through contact K1A. The energizing relay K1 opens normally closed contact K1B in Quadrac Q2 circuit to de-energize clamping solenoid S1 and remove power from timer clutch TM1. At the same time the normally open contact K1C closes to apply power to motor M1 through Quadrac Q1 circuit and motor M1, by means of cooperating rollers 200, 201, and drives the copy card 98 toward exit hopper 110. Also, when the trailing edge of the copy card 98 passes the development sensor the light from lamps LT1 and LT2 is no longer reflected into photocell CD1 which causes relay K2 to drop out. When the power is removed from relay K2 normally open contact K2D opens, and this removes power from relay K1. At this time the developer circuit is then in its initial condition and ready to accept the next copy card 98.

In order to prevent a copy card 98 from leaving the exposure station 65 and entering the developer station 39 while a card is still being developed, there is provided an interlock circuit which is included between the developer and exposure station. The interlock circuit consists of contacts K5D, K4E and K2C in series. If a card is in the developer station, relay K2 is energized and contact K2C is closed. If a copy card 98 is in the exposure station contact K5D is closed. When timer TM2 completes its exposure cycle it causes relay K4 to be energized which closes contact K4E. The circuit for relay K1 is then completed and it is energized closing contact K1C in the circuit of motor M1. Simultaneously it opens contact K1B in the developer clamp solenoid S1 circuit which de-energizes the solenoid and releases the copy card from the developer gas chamber.

The copy selector circuit operates as follows: The DC power supply consisting of transformer TF1, bridge rectifier D10, resistor R8 and capacitor C5 supplies the power for the counter circuit. DC voltage is applied to the counter through the normally open contacts K7D and K7E. Selection of the number of copies to be produced is made with the Unitset Switches SW1 and SW2. Each time a copy is made, contact K3B closes which energizes the counters U1 and U2. When the number of copies set on switches SW1 and SW2, relay K6 and master card stop solenoid S4 are energized. Relay K6 locks itself through contact K6A (Six). This closes contact K6B in the Quadrac Q3 circuit energizing pressure pad solenoid S5 thus releasing pressure between the master card 89 and copy card 98. Contact K6C opens thereby preventing the exposure timer TM2 from operating while the master card 89 is in motion. Contact K6D also closes which energizes the circuits for motors M2 and M3 driving the master card 89 out of the exposure station itno the exit hopper and moves the next master card 89 into position in the exposure station 65. When the trailing edge of the master card 89 leaving the exposure station 65 passes the master card sensor, light from lamps LT5 and LT6 no longer reflects into the photocell CD3. This causes relay K7 to drop out. The normally closed contacts K7F and K7G close connecting the counters U1 and U2 to the transformer TF1 through diode D9. The counters then receive pulses of half wave 60 cycle power which causes them to count continuously until they reach zero. They are then in the reset condition ready for the next counting operation. As soon as the next master card's leading edge passes under the master card sensor assembly, relaly K7 picks up opening normally closed contacts K7F, closing contacts K7D and K7E. The circuit is then ready to count the next exposure sequence. The present invention operate automatically and a means is provided for programming the machine, and wherein there is provided a digital read out area. The present invention will handle various types of film and, if desired, the ammonia system can be eliminated and replaced by a thermal element to develop thermal type cards. The cards are always in separate tracks and with the present invention it is easy to gain access to the various stations such as the exposure station. A sensing device is provided to assure that exposure will not take place until the machine is ready to operate. The tray 77 is adapted to be held in place by the magnets 328. An important aspect of the invention is the crossing of the cards and the two separate tracks. Also, a novel means is provided for moving the cards from one location to the next location, and various cycles such as the exposure cycle are initiated at the proper time. As shown in FIG. 2, for example, the master card 89 follows a path indicated by the arrows 340, and the copy cards 98 follow a path indicated by the arrows 341 so that the track systems are 90 degrees to each other. The present invention can also use an automatic roll attachment.

The feeder stations for the master cards and copy cards are adtpted to have weighted members to be used therewith for applying sufficient downward pressure or weight to the cards.

The opening 81 in the card tray 77, FIG. 7, is shaped to permit jam-free movement of cards and thus the leading edge of a card cannot hit a tray edge. The tray 77 is adapted to be made of a ferrous material for coaction with the magnets 328. FIGS. 10, 11 and 12 show the copy card track below the portion 78 of the tray 77. Other important aspects or features of the present invention are the card movement wherein the copy card is in a separate track from the master card and perpendicular to it and with the cards meeting at the exposure station. The card tray 77 has a thin section 78 between the copy card and master card, and wherein there is provided for hole or opening 81 for contact printing of the copy card in the exposure station. The tray 77 is held by the magnets 328 and the tray is easily removable and forms a common wall of the two card paths. Also, with the present invention there is easy access to cards if jams occur in the exposure station since the exposure station pivots open and the tray is easily removed.

With further reference to the gas system, this is unique, and wherein anhydrous ammonia is supplied as shown in the drawings and wherein there is provided a quick disconnect, a regulator controlling the pressure, on and off switches, the developer timer and a developer chamber which is pressed down against the card and seals to the card around the film area with rubber gaskets, and the low pressure gas flows and leaks out a large hole, and wherein after leaving the developing chamber there is a restriction in the gas line to slow down the exit and finally the gas passes to the chamber.

Considering further the exposure pressure pad, the present invention uses a pressure pad driven by a spring, and a solenoid pulls the pad open that is away from the film. The advantages of this construction are that there is automatic action and no vibration during exposure and, in addition, there is better use of the solenoid inasmuch as the time is less than 50% of the time cycle. Attention is further directed to FIG. 8 of the drawings wherein there is shown a portion of the card roller system wherein the roller 200 is an idler and is free rolling, wherein there is provided an eccentric 324, FIG. 9, which is keyed to the idler shaft, and the idler shaft 343 does not rotate and only pivots. In FIGS. 8 and 9 the numeral 344 indicates the drive shaft with the roller 201 thereon. The idler 200 presses against the drive roller by action of the spring 345. When a card enters, the idler 200 pivots open but still maintains normal pressure and thus grabs the card and drives the card through in the proper manner.

The repeater equipment has a means for indicating to the operator that the exposure lamp is up to full intensity, and this is necessary to prevent the operator from operating the equipment prematurely and thus wasting copy cards due to under exposure. To accomplish this a sensor is used to detect when the exposure lamp is actually emitting light. In addition, means is provided for determining that the lamp is up to full intensity, and this condition is judged by the voltage drop across the lamp, and the present invention also makes the indicator device for an operator as simple as possible, and this is shown in FIGS. 17A and 17B. Its operation is as follows:

When voltage is applied to the ballast transformer primary, a high voltage is applied to the mercury vapor lamp (approximately 250 volts) to cause it to "strike" or ignite. This same voltage is applied to the series circuit composed of the indicator lamp and Quadrac. The indicator lamp has a voltage rating of 120 volts AC. If the Quadrac circuit is not triggered "on" only a negligible amount of current flows through the indicator light and it does not glow. The amount of current flows depends upon the resistance value of the photocell and the value of the capacitor in series with it. When the photocell is not illuminated its resistance value is very high (approximately 48 megohms).

If the exposure lamp does not turn on to light will fall on the photocell. Thus the Quadrac is not triggered on and the indicator light does not glow. If the exposure lamp does strike the voltage across it drops to approximately 10 volts. This same voltage applied to the indicator light-Quadrac series circuit. However, it is too low in value for the Quadrac to trigger even though the photocell is being illuminated by the exposure lamp. As the exposure lamp warms up its light intensity increases and the voltage drop across it increases. At full intensity the voltage applied across the indicator lamp-Quadrac series circuit is approximately 95 volts. The aperture between the exposure lamp and the photocell is designed so that the photocell resistance is decreased to a value which will trigger the Quadrac "on" when the voltage drop across the exposure lamp is approximately 95 volts.

With this device the indicator lamp will not glow until the exposure lamp voltage is of the correct magnitude and its light intensity is high.

With reference to the reflection sensor device, there is provided a novel photoelectric sensor device which permits the detection of relatively low reflectance of thin objects such as paper or plastic against a reflecting background surface located in proximity to the thin material. This construction is shown in the drawings, wherein, as shown in FIG. 5, for example, two light sources are placed equidistant from and on either side of a photocell. Light from the sources is directed through narrow channels positioned at an angle to a central channel leading to a photocell. The angle between the channels is chosen to cause the light beams leaving the sensor block to intersect a short distance from the lower surface of the block and immediately in front of the channel leading to the photocell. The angle between the intersecting light beams is made as large as possible so that the beams separate widely as they leave the intersection.

It will now be clear that there is provided a device which accomplishes the objectives heretofore set forth. While the invention has been disclosed in its preferred form, it is to be understood that the specific embodiment thereof as described and illustrated herein is not to be considered in a limited sense as there may be other forms or modifications of the invention which should also be construed to come within the scope of the appended claims.

What is claimed is:

1. A card copying machine comprising a master card receptacle, a photosensitive copy card receptacle, an exposure station having an exposure lamp; a developing station, a copy card receiver, means to move master cards and copy cards to superimposed positions at said exposure station along separate, mutually perpendicular paths, means to move the exposed copy cards to the developing station and to develop the copy cards, and means to then move the developed copy cards to the copy card receiver.

2. In an aperture card reproducer and duplicator, card movement tracks for movement of the master cards and copy cards whereby the track for the master card is perpendicular to the track for the copy card, said tracks being separated at their junction by a thin member which forms a common section of each track, said thin member having an opening therein which permits the film of the master card in its track and the copy card in its track to be intimately contacted when the cards are aligned for exposure of the copy card film, and means for film developing adjacent the copy card track for developing the exposed film in the copy cards.

3. Apparatus for duplicating aperture cards comprising: means for transporting a master aperture card along a path to an exposure station; means for transporting a duplicate aperture card having unexposed film therein along a separate path to the exposure station; means for placing the master card and the duplicate card in juxtaposition; means for exposing the unexposed film in the duplicate card; means for transporting the exposed duplicate card to a developing station; means at the developing station for developing the latent image in the exposed film in the duplicate card; means for transporting the developed duplicate card to an exit hopper; and means for transporting the master aperture card from the exposure station to an exit hopper.

4. The apparatus of claim 3 and wherein the transport path of the duplicate card is at right angles to the transport path of the master card.

5. The apparatus of claim 3 and wherein the means placing the master card and the duplicate aperture card in juxtaposition comprises: biasing means for pressing the juxtaposed master card and duplicate card into intimate contact, a radiation source for exposing the film in the duplicate card, and solenoid means for controlling the biasing means pressure to permit the cards to be juxtaposed prior to exposure and for removing the pressure after exposure to permit the cards to be transported from the exposure station.

6. The apparatus of claim 3 and including a first storage hopper for storing the duplicate aperture cards, means for removing the duplicate cards from the first storage hopper for transport to the exposure station, and control means for controlling the removal of a preselected number of duplicate cards from the storage hopper, said control means including circuit means for actuating transport of the master aperture card from the exposure station after the preselected number of duplicate cards has been exposed.

7. The apparatus of claim 6 and including a second storage hopper for storing master aperture cards to be duplicated, and means for removing master aperture cards from the second storage hopper for transport to the exposure station, and wherein the control means includes circuit means for actuating transport of a master card to the exposure station upon removal of the previously duplicated master card from the exposure station.

8. Apparatus for making duplicate aperture cards comprising: a first hopper for storing unexposed copy cards; an exposure station adjacent said card hopper wherein an aperture card and a copy card may be juxtaposed for exposure of the copy card; a second hopper adjacent the exposure station for storing aperture cards to be duplicated; a developing station adjacent the exposure station for developing the latent image in the copy card after exposure; copy card feeding and conveying means for seriatim removal of copy cards from the first hopper and for advancing the copy cards to the exposure station, the developing station, and thence to an exit hopper; aperture card feeding and conveying means at the second hopper for removing an aperture card to be copied and advancing the aperture card to the exposure station; and control means for determining the number of copy cards to be removed from the first hopper and exposed, said control means including circuit means for controlling the removal from the exposure station of the aperture card which has been copied and controlling the feeding of the next aperture card for copying.

9. The apparatus of claim 8 and wherein the control means includes a circuit responsive to the presence of a card in the developing station so that an exposed copy card will not be removed from the exposure station until the developing of the card in the developing station has been completed.

References Cited
UNITED STATES PATENTS 3,116,675   1/1964   Trimble     355—100
3,211,073   10/1965   Fosse et al.     355—100

JOHN M. HORAN, Primary Examiner

R. A. WINTERCORN, Assistant Examiner

U.S. Cl. X.R.
355—106